Feb. 1, 1966   G. H. SCHURGER ETAL   3,232,143
CONTROL FOR MACHINE TOOLS
Filed Aug. 17, 1961   7 Sheets-Sheet 1
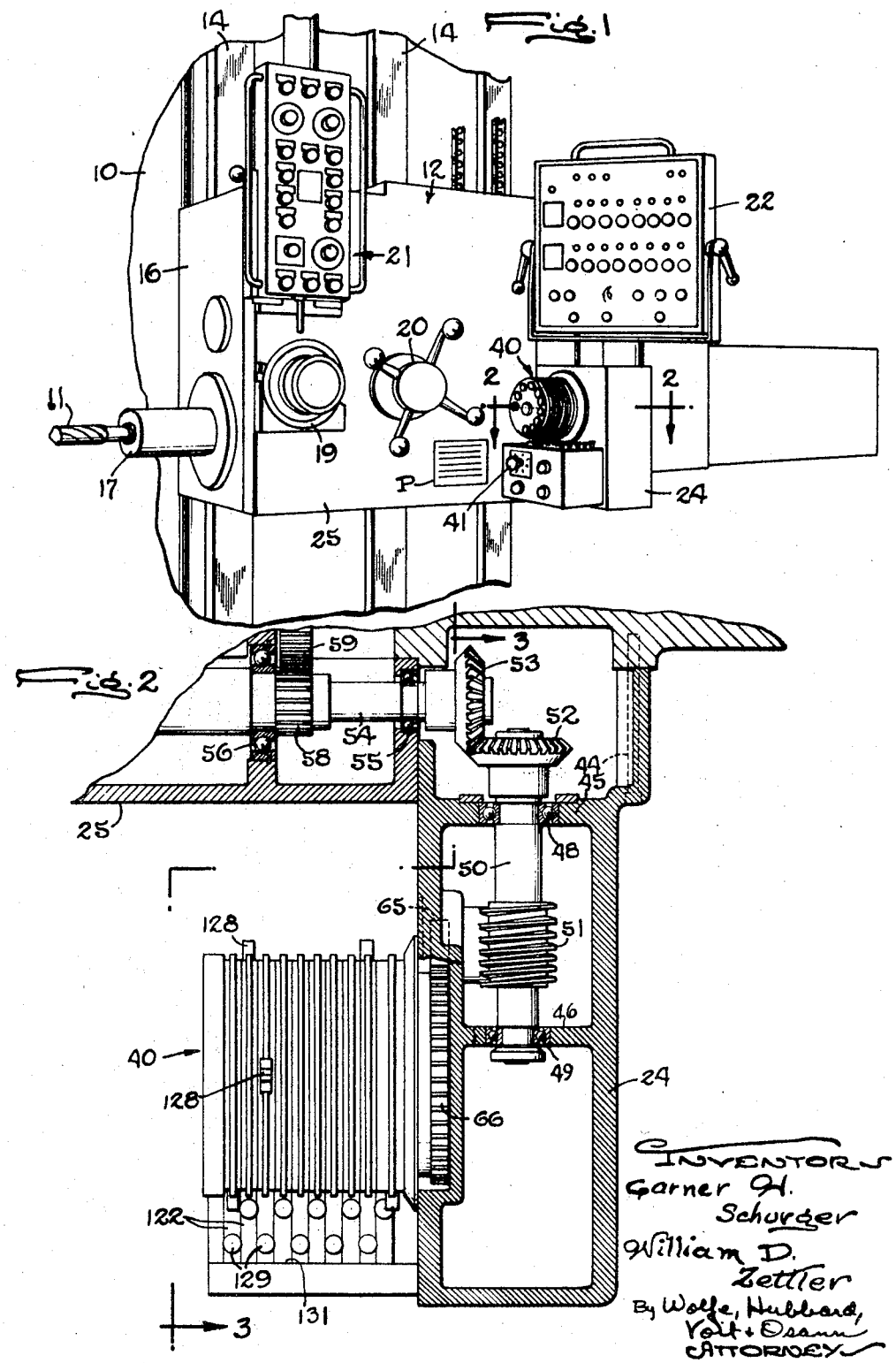
INVENTORS
Garner H. Schurger
William D. Zettler
By Wolfe, Hubbard, Voit & Osann
ATTORNEYS

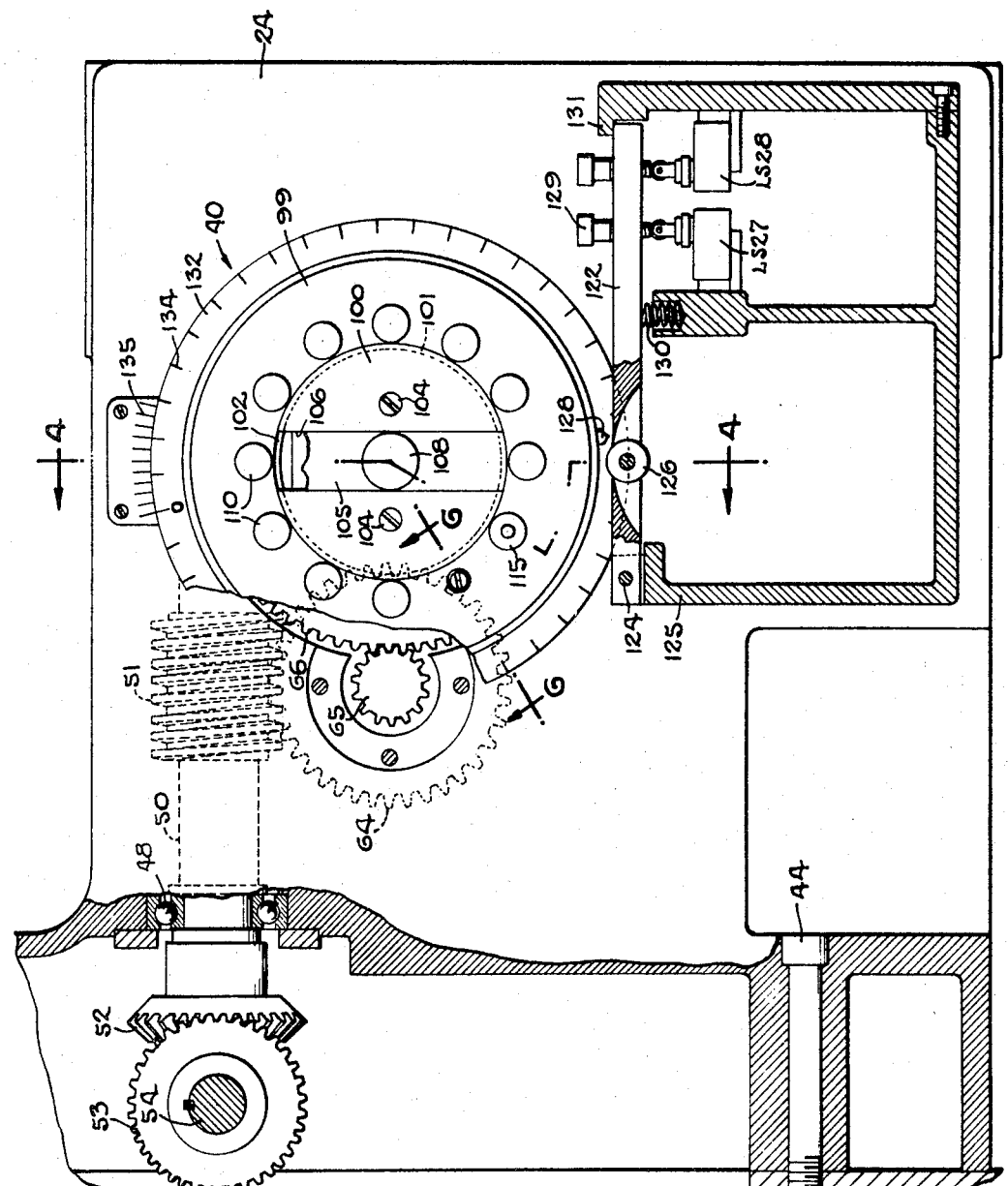

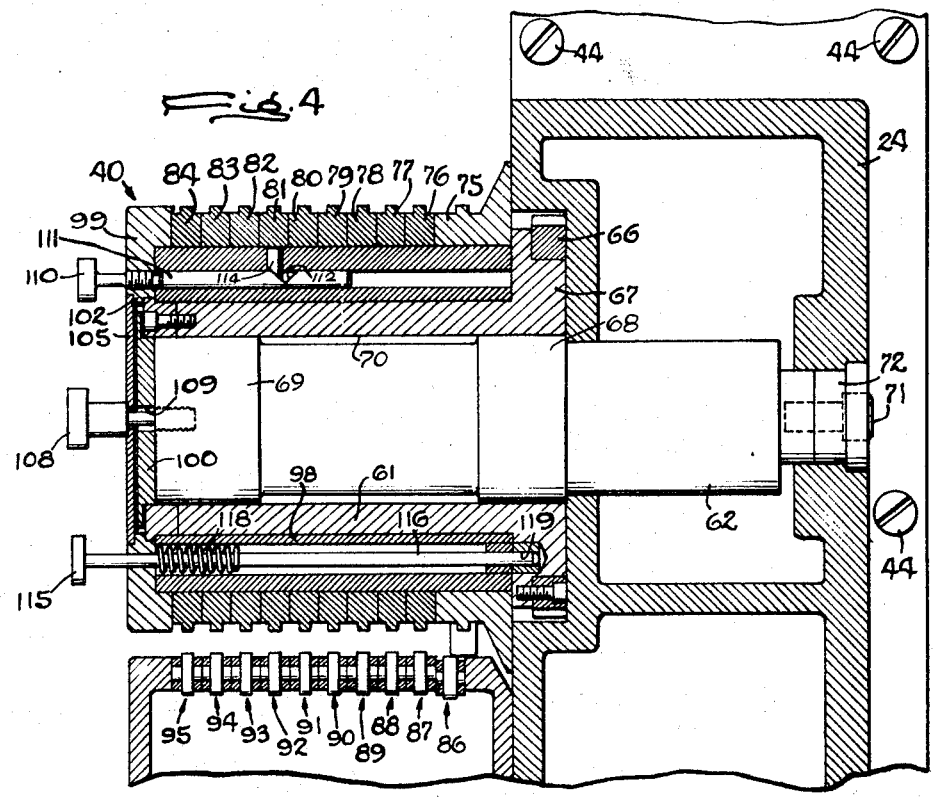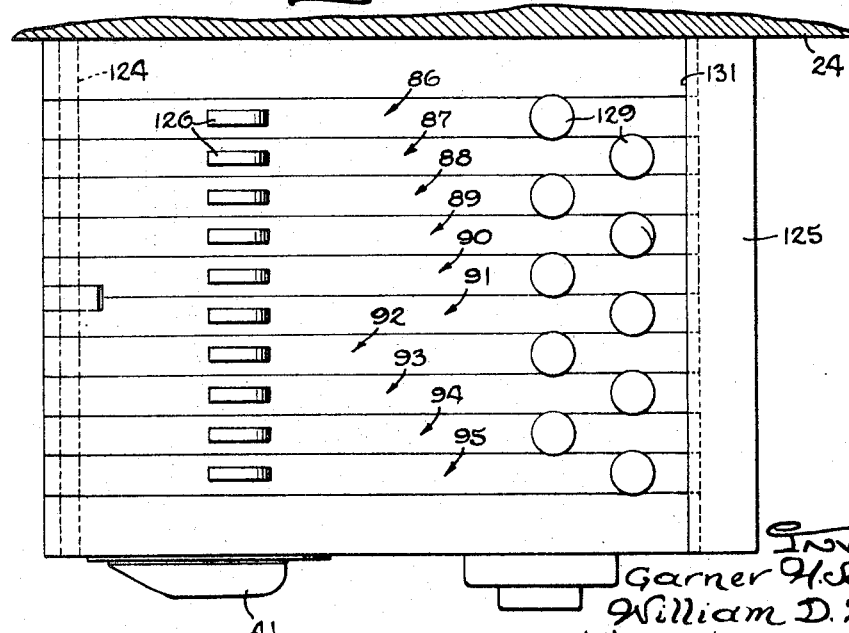

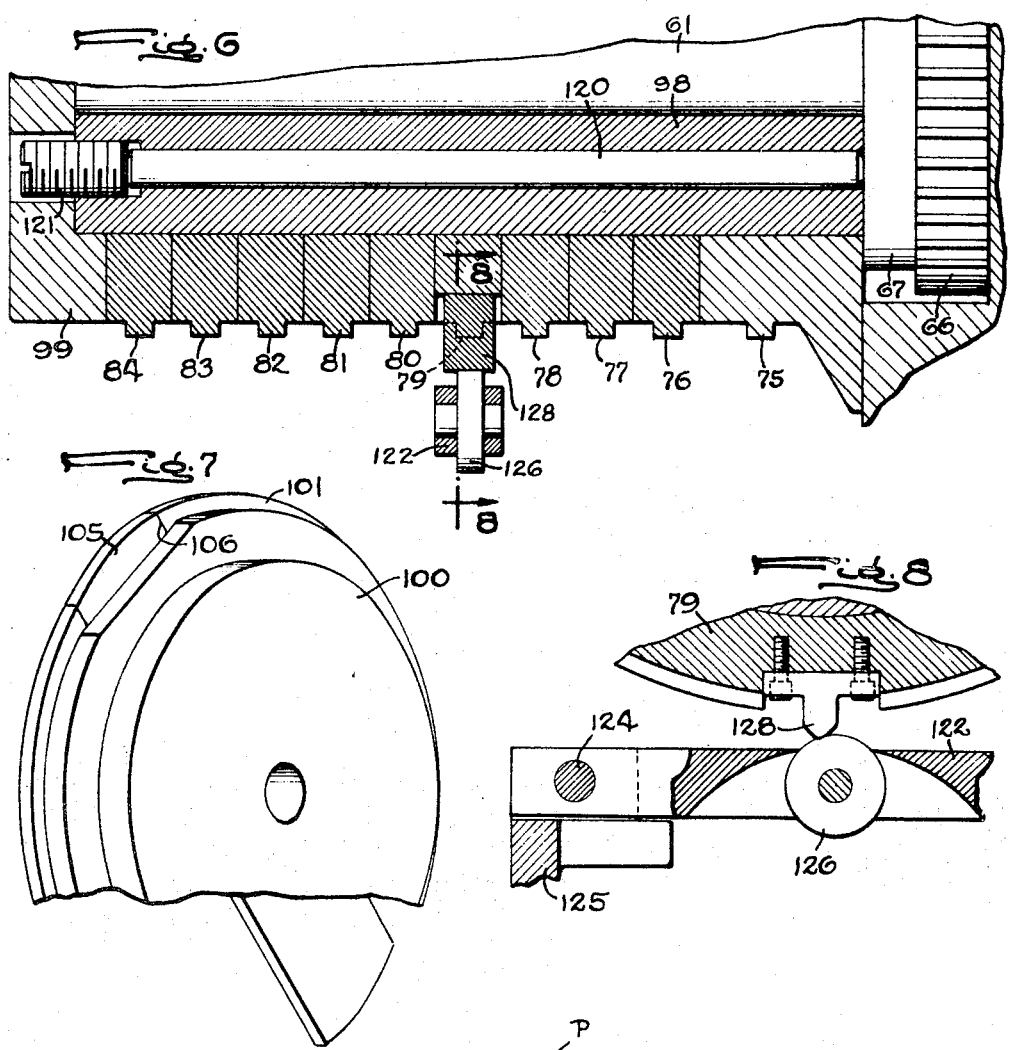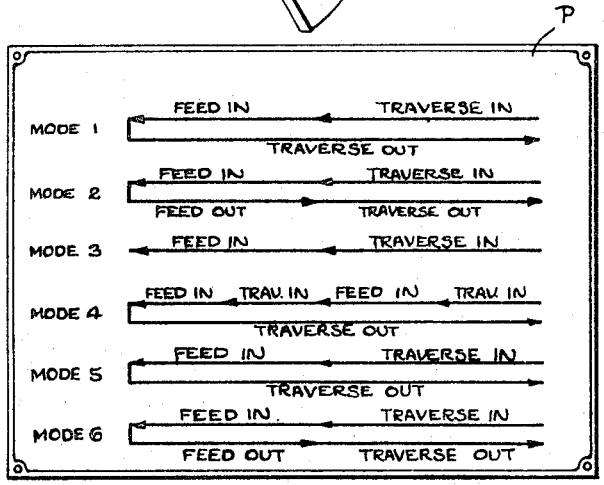

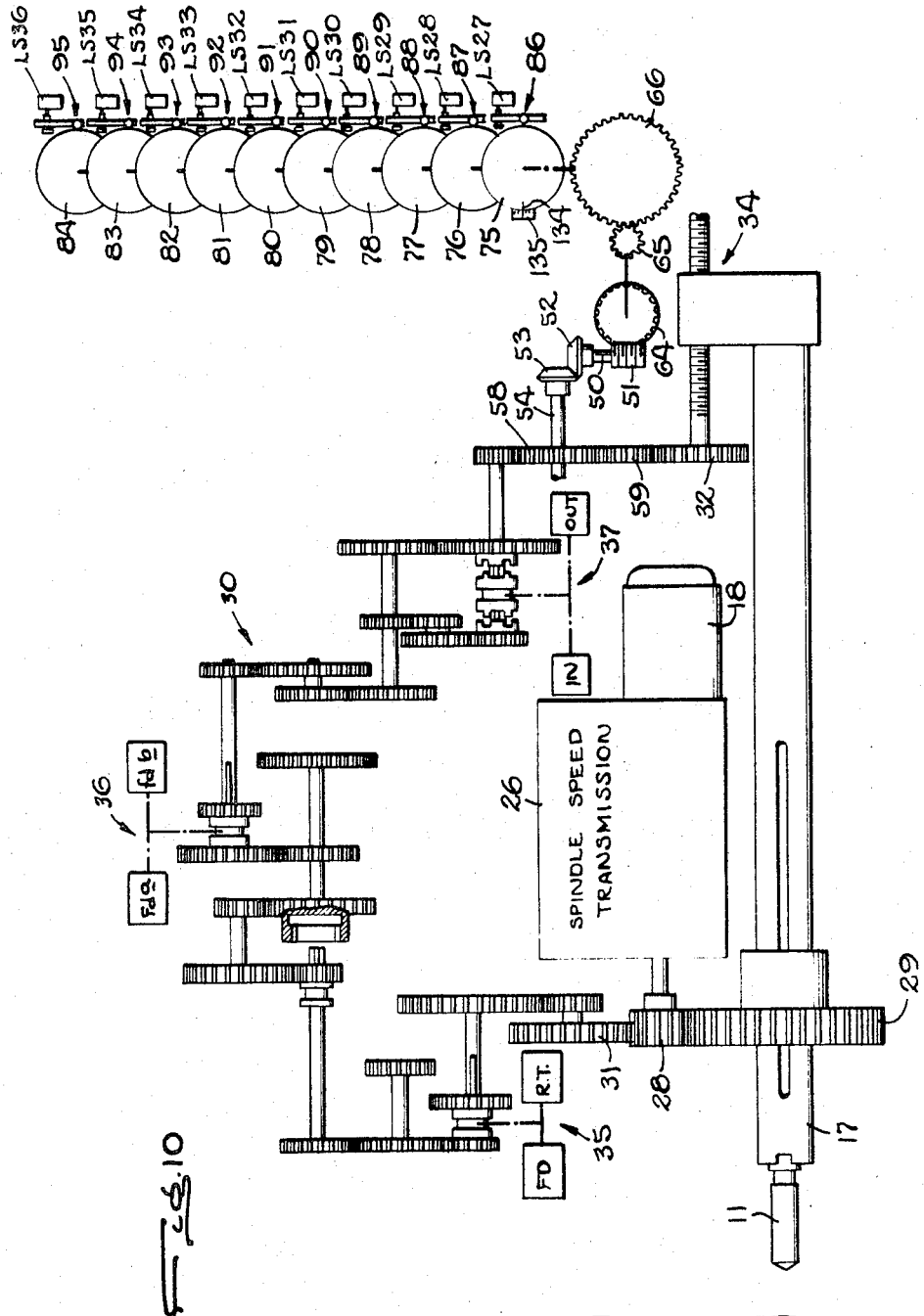

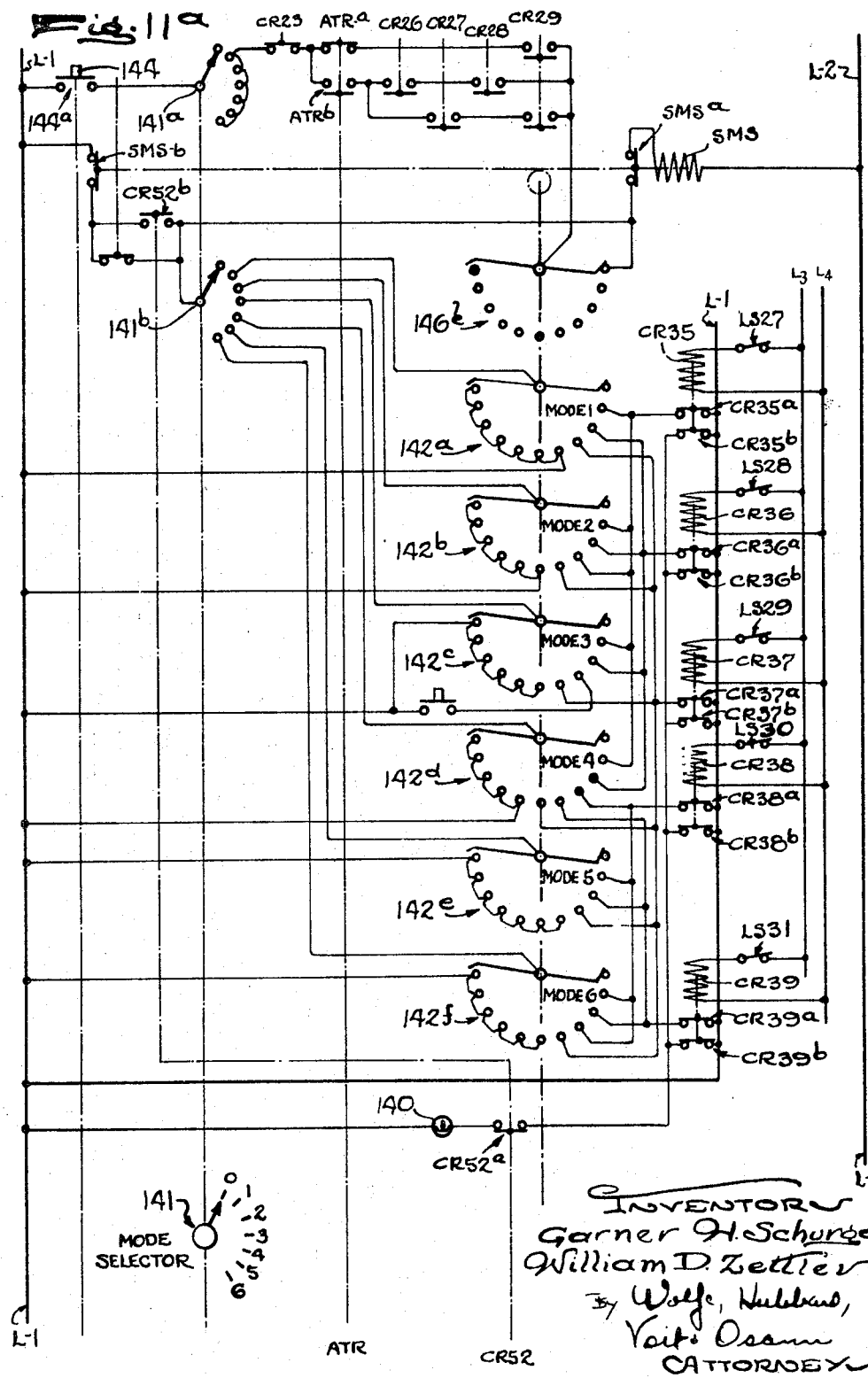

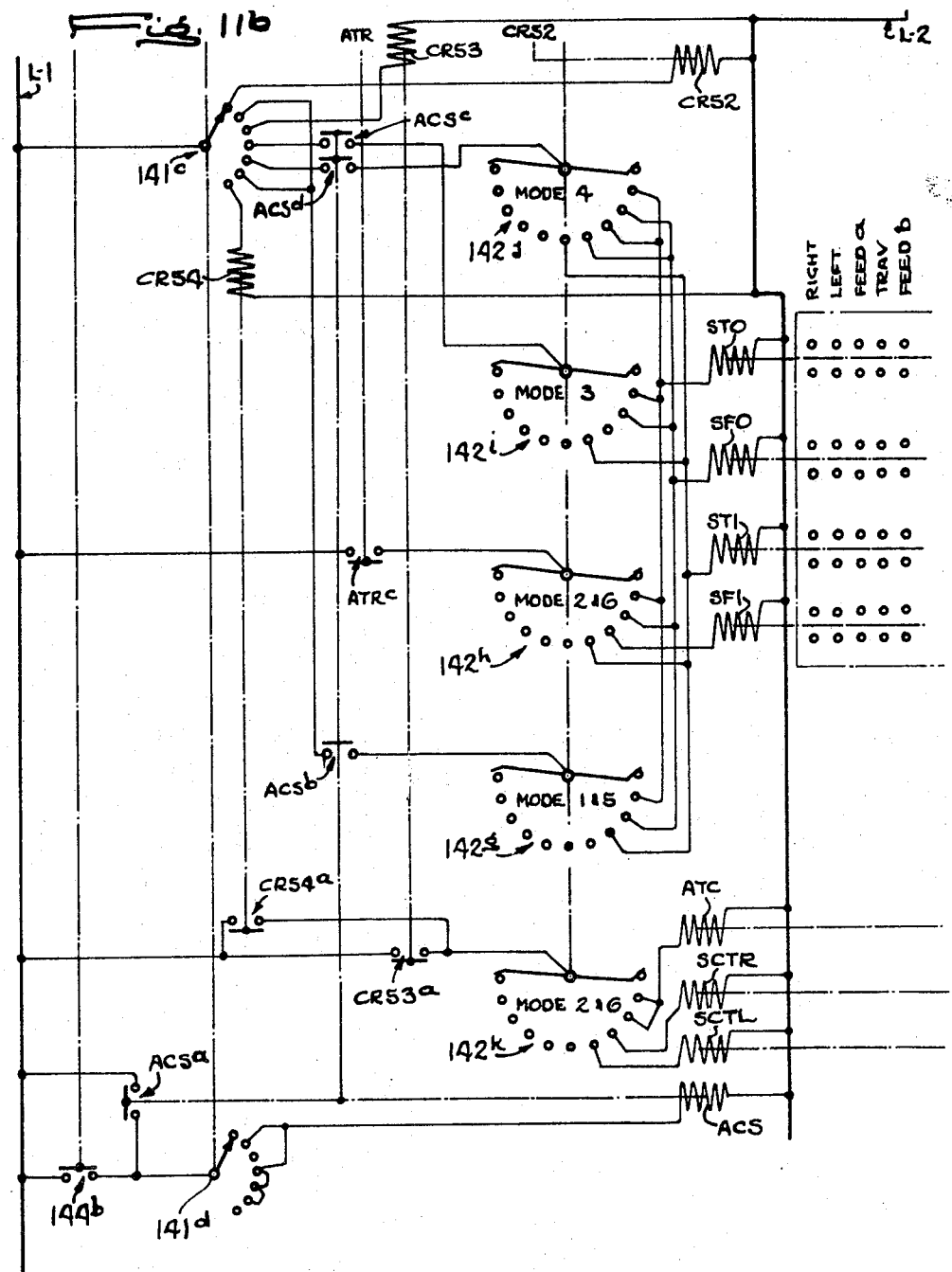

United States Patent Office 3,232,143
Patented Feb. 1, 1966

3,232,143
CONTROL FOR MACHINE TOOLS
Garner H. Schurger and William D. Zettler, Fond du Lac, Wis., assignors to Giddings & Lewis Machine Tool Company, Fond du Lac, Wis., a corporation of Wisconsin
Filed Aug. 17, 1961, Ser. No. 132,051
9 Claims. (Cl. 77—32.8)

The present invention relates to controls for machine tools, and more particularly to controls which define automatically a cycle of operations of a machine tool during which a machine tool element and a workpiece are moved relative to each other through a predetermined sequence of movements.

One object of the present invention is to provide a novel control mechanism which is of a relatively simple and inexpensive construction, and which is easy to set and adjust with a minimum of manipulative operations.

Another object is to provide a control mechanism of the foregoing character which may be accurately set to a desired preselected position and which maintains its accuracy over a substantial number of operational cycles.

A further object of the invention is to provide a novel control mechanism of the type described which can be readily adjusted to perform any one of a plurality of cycles or modes of operation of a machine tool element, and which also indicates precisely the position of the element being controlled.

A more specific object of the invention is to provide a novel machine tool control mechanism of the foregoing character, finding particular but not necessarily exclusive use on machine tools with translatable spindles, for controlling the feed cycle of such spindles.

Still another object of the present invention is to provide a control mechanism of the foregoing character which is adapted for use with machine tools having both manual and automatic or tape controlled mechanisms.

Other objects and advantages of the present invention will become apparent as the following description proceeds, taken in connection with the accompanying drawing wherein:

FIGURE 1 is a perspective view of a machine tool headstock including a control mechanism embodying the present invention.

FIG. 2 is a sectional view through the control mechanism taken substantially in the plane of line 2—2 on FIG. 1.

FIG. 3 is an elevation view partially in section and with parts broken away illustrating the control mechanism embodying the present invention.

FIG. 4 is a section view taken substantially in the plane of line 4—4 on FIG. 3.

FIG. 5 is a plan view of a switch and lever mechanism forming a part of the control mechanism shown in FIG. 3.

FIG. 6 is a section view taken substantially in the plane of line 6—6 on FIG. 3.

FIG. 7 is a perspective view of a friction clamping device forming a part of the control mechanism embodying the present invention.

FIG. 8 is a section view taken substantially in the plane of the line 8—8 on FIG. 6.

FIG. 9 is a diagrammatic representation of control modes presented in the form of a plate to be attached to the headstock as shown in FIG. 1.

FIG. 10 is a schematic gear layout of the spindle feed gear mechanism and control mechanism embodying the present invention.

FIGS. 11a and 11b are diagrammatic representations of an illustrative control circuit for use with a control mechanism embodying the present invention as shown in FIG. 10.

While a certain illustrative embodiment of the invention has been shown in the drawings and will be described below in considerable detail, it should be understood that there is no intention to limit the invention to the specific form disclosed. On the contrary, the intention is to cover all modifications, alternative constructions, equivalents, and uses falling within the spirit and scope of the invention as expressed in the appended claims.

The invention as illustrated in the drawings is exemplified in connection with an illustrative horizontal boring, milling and drilling machine (FIG. 1) which comprises a vertical column 10 supported on a base (not shown) and carrying on one face a headstock 12 which is guided for vertical movement on the column by appropriate ways 14. The illustrated headstock 12 comprises a main housing 16 which is equipped with a horizontally disposed axially slidable tool spindle 17 projecting from the front face thereof and carrying a tool 11 such as a drill bit as shown. For rotationally driving the spindle, a motor 18 is mounted at the rear of the headstock and connected to the spindle through a multispeed transmission (a portion of which is shown schematically in FIG. 10) housed within the headstock housing 16. A plurality of control instrumentalities are mounted on the right-hand side of the headstock, including a spindle speed indicator dial 19 and a control knob for setting the same, and a pilot wheel 20 for controlling the axial feed of the spindle. Various control switches and the like are carried by a pendant control station 21 which can be mounted on the headstock or suspended within reach of an operator as he moves about the machine. In addition to the speed selector, the pilot wheel, and the pendant control station, the headstock also includes an electrical input-readout control panel 22 mounted on a bracket 24 fixed to and extending outwardly from the right-hand face or cover 25 of the headstock.

The headstock feed transmission shown schematically in FIG. 10 affords a number of different operation cycles or modes. The spindle drive motor 18 drives a spindle speed transmission 26, the output of which is connected to the spindle 17 by means of an output gear 28 and a bullgear 29. The spindle feed to and from the workpiece is provided through a feed gear transmission indicated generally at 30 having an input gear 31 connected to the speed transmission and an output gear 32 operatively connected to a suitable spindle feed gear mechanism 34. Included in the feed transmission 30 are gear shifting arrangements to provide for feed movement, rapid traverse, and change of direction of the spindle. The gears in the feed transmission are shifted by appropriate means, usually hydraulic, under the control of solenoid valves which are energized by corresponding relay coils and switch contacts. Such gear shifting arrangements are well known in the art and can be adapted by those skilled in the art for the type of machine tool and control under consideration.

To illustrate the use of the present invention, a simple feed transmission 30 has been shown in FIG. 10, in which an appropriate gear shifting arrangement 35 is provided for selecting spindle feed (FD) or spindle rapid traverse (RT), an arrangement 36 is provided for selecting slow feed ($FD_a$) or fast feed ($FD_b$) and an arrangement 37 is provided for selecting spindle direction (in or out). With these gear shifting arrangements, together with corresponding controls (FIGS. 11a and 11b), it is possible to obtain spindle traverse out by energizing a master relay coil STO, spindle traverse in by energizing a master relay coil STI, spindle feed out by energizing a master relay coil SFO, and spindle feed in by energizing a master relay coil SFI, as well as obtain variation in rate of feed. For each arrangement the corresponding master control relay coil is provided (FIG. 11b) which when energized actuates the necessary relays, and solenoid valve contacts, shown diagrammatically in FIG. 11b, to effect the required gear shifting operation. In addition, the direction of spindle rotation is controlled by relay coils SCTR and SCTL. These operations can be put together in various permutations or automatic cycle modes as indicated schematically in FIG. 9. In the present instance, the mode diagram shown in this figure is presented as a plate or label P which can be attached directly to the machine tool. Mode 1 for example is a drilling mode wherein the tool spindle 17 is traversed out (STO) to the point where the drill bit 11 engages the workpiece at which point drilling begins. The spindle then shifts to feed (SFO) during drilling. At the completion of the drilling operation the feed direction is reversed and the spindle is traversed in (STI) and the machine shut off or prepared for a subsequent cycle. Mode 2 is shown as a tapping mode or automatic tapping cycle. The machine tool is conditioned by a tap switch which energizes a tap relay coil ATR (not shown). The spindle, equipped with a tap, is traversed outwardly. An automatic tap clutch is energized by an appropriate coil ATC, and then engaged with the work. At the completion of the tapping, the spindle rotation direction is reversed (as controlled by relay coils SCTR and SCTL) and coil SFI is energized so that the tap is withdrawn at a feed rate, and finally coil STI is energized so that the tap and spindle are traversed inwardly.

The present invention contemplates a novel means for preselecting a mode and carrying out the mode cycle automatically as a function of the axial position of a tool carrying spindle. The invention is embodied in a trip disc device 40 which, together with a mode selector switch 41, determines the spindle operation. The trip disc 40 and mode selector 41 are mounted on the rigid bracket 24 extending outwardly from the right-hand face of the headstock. In the illustrative headstock construction shown in the drawings, the bracket 24 comprises a hollow box-like member secured to the headstock by bolts 44 and provided with internal partitions 45, 46 having apertures therethrough containing bearings 48, 49 journaling a worm gear shaft 50 carrying a worm gear 51 at a point intermediate the bearings 48, 49. One end of the shaft 50 extends from the bracket 24 to a point adjacent the headstock where it is provided with a bevel gear 52 which meshes with a corresponding bevel gear 53 on a shaft 54 extending rearwardly from the headstock and journaled in bearings 55, 56 therein.

A direct drive between the worm gear 51 and the headstock spindle transmission 30 is provided through the bevel gears 52, 53 by a pinion gear 58 fixed on the headstock shaft 54 and operatively coupled to the feed transmission output gear 32 by a pinion gear 59 (FIG. 10). It will be appreciated that as the spindle feed gear train 30 rotates to drive the spindle, the worm gear 51 will be rotated at the same time. In order to provide an accurate indication of the spindle movement, the gear ratios in the gear train coupling the spindle to the trip disc are selected so that for full spindle travel the trip disc device 40 makes one full rotation.

For purposes of controlling the spindle operation as a function of the spindle travel, and at the same time indicating the position of the spindle, the trip disc mechanism embodying the present invention comprises a sleeve-like drum 61 journaled for rotation on a shaft 62 fixed in the bracket 24 and directly coupled with the spindle feed transmission through the worm gear 51 which drives a worm wheel 64 coupled with a pinion gear 65 which in turn meshes with a ring gear 66 carried on a flange 67 on the drum 61 (FIGS. 2, 3, and 6).

In order to support and journal the drum 61 for smooth even rotation, the shaft 62 is provided with a pair of spaced relatively wide, smooth bearing surfaces 68, 69, on which the internal surface 70 of the drum is supported. The shaft 62 is held in the bracket by any appropriate means such as a threaded fastener 71 extending through a bushing 72 mounted in one wall of the bracket 24 into engagement at the end of the shaft 62.

The operation of the spindle is controlled as a function of spindle travel by the trip disc mechanism which is coupled for rotation directly with the spindle feed transmission. To this end, the trip disc mechanism includes a plurality of individually adjustable discs 75, 76, 77, 78, 79, 80, 81, 82, 83 and 84, each carrying an associated dog for engagement with the corresponding limit switch or actuator mechanism 86–95, respectively.

For purposes of adjustably mounting each of the trip discs 75–84 on the drum 61 which is rotated as a function of the spindle feed, there is provided a clamping sleeve 98 surrounding the drum 61 and supporting each of the annular trip discs 75–84. The trip discs 75–84 and the clamping sleeve 98 are retained on the drum by annular retainer ring 99 which is held on the assembly by a retainer plate 100 fixed to the free end of the shaft 62 and formed with a marginal flange 101 which overlaps an inner marginal flange 102 on the retaining ring 99 (FIGS. 3 and 4). The plate 100 is held on the end of the shaft 62 by screws 104 threadably engaged with the shaft.

Means are desirably provided for use during adjustment of the trip discs 75–84, to hold the clamp sleeve 98 stationary with respect to shaft 62. One illustrative means is shown in FIGS. 3, 4 and 7 and comprises a leaf or strap 105 recessed in a diametral channel 106 formed in the outer face of the retainer plate 100 and having a length such that the ends of the strap extend over the flange 102 of the retainer ring 99. To tighten the strap to clamp the retainer ring to the shaft, a thumb screw 108 is threadably engaged with the end of the shaft and is provided with a shoulder 109 which abuts the strap. By loosening or tightening the thumb screw 108, the strap 105 can be loosened or tightened against the retainer ring. When the strap is tightened, the retainer ring 99 and thereby the clamp sleeve 98 is frictionally held against relative rotation with respect to the shaft 62 so that the trip disc rings 74–85 may each be individually rotated without disturbing the setting of the others.

In order to lock each trip disc individually to the clamp sleeve 98, there is provided a plurality of clamping devices corresponding in number to the number of trip discs and each comprising a thumb screw 110 threadably mounted in the retainer 99 and engaging an axially slidable clamp rod 111 positioned in an axially extending hole 106 in the clamp sleeve 98. The clamp rod 111 is provided with a V-shaped notch 112 receiving a bevelled end of a friction clamping plunger 114 which projects radially outwardly through the clamping sleeve 96 into frictional engagement with the corresponding one of the trip discs. Referring to FIG. 4 for example, it can be seen that the plunger 114 extends into engagement with the inner surface of the trip disc 81. When the thumb screw 110 is tightened, the bevelled end of the plunger 114 is engaged by one side of the V-notch 112 in the rod 111 and the plunger is cammed radially outwardly into frictional engagement with the trip disc 81. Similar friction locking devices are provided for each of the trip discs 75-84 so that each disc 75-84 can be adjusted and clamped individually on the clamping sleeve 98.

For purposes of positively coupling the clamping sleeve 98 to the rotatable drum 61, a pin type locking mechanism 115 is provided which includes a plunger 116 urged by a spring 118 into a corresponding aperture 119 in the ring gear supporting flange 67 of the drum 61 (FIG. 4). In circumstances and conditions wherein it is required that the clamping sleeve 98 be offset relative to the drive sleeve or drum 61, the plunger 116 may be disengaged and the trip discs rotated to the desired offset position. To hold the trip discs in the position, there is provided an auxiliary friction clamping device which includes a plunger rod 120 engaged at one end by a locking screw 121 threadably mounted in the clamping sleeve 98, and at its other end frictionally engaging the flange 67 of the rotating drum sleeve 61 (FIG. 6).

The limit switch operating lever mechanisms, 86-95 inclusive, are identical and for purposes of brevity only one will be described in detail. Referring to FIGS. 3, 6 and 8, the lever mechanism there shown comprises a bar 122 pivoted by means of a pin 124 on a frame 125 mounted on the bracket 24. Intermediate its ends the bar 122 carries a cam roller 126 engageable by a dog 128 fixed to the corresponding trip disc (79, as shown in FIGS. 6 and 8). At the end of the lever 122 opposite from the pivot 124, there is mounted an adjusting screw 129 which is threadably engaged with the lever and extends therethrough into engagement with the corresponding limit switch as shown in FIG. 3, ten of which LS27-LS36 are provided in the present embodiment. For biasing the lever 122 upwardly when the cam wheel 126 is not engaged by the corresponding dog 128, there is provided a spring 130 mounted on the frame 125 and engageable with the underside of the lever 122. Upward movement of the lever is restrained by an overhanging ledge 131 on the frame 125 at a point adjacent the free end of the lever 122.

It will be appreciated that any number of trip discs can be employed, depending upon the number of different mode operations desired. In the embodiment of the invention illustrated in FIGS. 1-10 ten trip discs are shown, although more or less could be provided as desired.

For purposes of indicating spindle position, the disc 75 is provided with a flange 132 carrying a scale 134 which cooperates with a corresponding indicator scale 135 fixed on the bracket 24 (FIG. 3). By observing the position of the scale 134, an accurate indication of the spindle position can be readily obtained.

An illustrative electrical control circuit and supply line L1-L2 for a machine tool on which it is desired to determine spindle feed modes are shown in FIGS. 11a and 11b. In this diagram circuit means are shown for controlling the spindle movement including rapid traverse, feed and return, in order to carry out the various modes such as is shown in the mode diagram, FIG. 9. It will be appreciated by those skilled in the art that the complete electrical circuit for a machine tool will be far more complicated than the portions shown in that it will include the numerous switching and conditioning controls necessary for the operation of a complex machine. To conserve space and shorten the description, the portion of the circuit shown is necessarily abbreviated and diagrammatic. The portion shown is believed to be sufficient to instruct those skilled in the art in one use of the present invention. In this portion of the control circuit, there are shown five of the limit switches, LS27-LS31, which are actuated by the first five trip discs 75-79 shown in FIG. 10. These limit switches, connected across a low voltage supply L3-L4, are normally closed as shown in FIG. 11a and when closed energize corresponding contact relay coils CR35 through CR39, respectively. When energized, the contact relay coils CR35-CR39 open contacts CR35a and CR35b through CR39a and CR39b, respectively, connected in the control circuits between the electrical supply lines L1 and L2. In the control circuit between lines L1 and L2 and including the contacts CR35b to CR39b is a pilot light 140 to show when one of the limit switches is open and the corresponding contact relay coil contacts are closed. This pilot light 140 is utilized when the various trip discs are being set to perform a particular mode of operation.

It is a simple matter to set trip discs to a desired mode. Assuming, for example, that the trip discs are to be set to carry out mode 1 (FIG. 9), a drilling mode wherein the tool is traversed rapidly to the workpiece, fed slowly during the drilling operation, and, when the operation is completed, traversed rearwardly to the start position. To set the trip discs, the spindle 17 carrying the drilling tool 11 is traversed outwardly to the position at which drilling is to commence. With the clamping sleeve 98 locked to the drum 61 by the locking plunger 115, the first trip disc 75 is released and turned to the zero position at which point the corresponding limit switch LS27 will be actuated to the open position. When switch LS27 is opened, the corresponding contact relay coil CR35 is deenergized allowing the contacts CR35b to close and light the pilot light 140. The adjusting screw 129 (FIG. 3) on the switch lever 122 may be adjusted in the event the pilot light does not light or the actuation is not sufficiently sensitive. When the pilot light is lit, the first trip disc 75 is clamped to the clamping sleeve 98 by means of the locking thumb screw 110.

When the first trip disc 75 has been clamped to the clamping sleeve, the plunger 115 is released so that the first trip disc together with the clamping sleeve 98 to which it is now fixed can rotate relative to the drum 61.

By referring to the drawing of the workpiece to be machined, the distance of spindle travel during the drilling operation can be determined and the first trip disc and locking sleeve is rotated a corresponding amount as shown on the index dial 134. The second trip disc 76 is then rotated until the pilot light 140 flashes "on," indicating that the corresponding limit switch LS28 has been opened to deenergize the associated relay coil CR36 and close the contact CR36b. The second trip disc 76 is then locked to the clamping drum 98 by the associated thumb screw. To insure against unintentional rotation of the first trip disc 75 and clamping sleeve 96 during the individual adjustments of the trip discs 76-84, the clamp 105 may be tightened to bind the clamping sleeve 98 to the stationary shaft 62.

After all of the rings have been adjusted according to the above described sequence, the assembly is returned to its starting position and locked with respect to the spindle feed drive by reengaging the plunger 115 in the socket 119 in the drum flange 67 (FIG. 4). The spindle 17 is traversed inwardly to the starting point, at which point an additional trip disc (e.g. trip disc 77) is set to indicate the innermost position of the spindle. When the pilot light lights, as switch LS29 is opened and relay coil CR37 is deenergized so contact CR27b closes, this disc 77 is locked to the clamping sleeve 98 and the trip disc is ready for operation. The trip discs are set for any desired mode of operation by following the procedure outlined above for each mode. It will be observed that once the initial position of the tool relative to the workpiece has been selected the trip disc can be set without moving the spindle simply by reference to the scales 134, 135 and the pilot light 140 together with a working drawing of the workpiece.

If during a series of machining operations it is desired to change a tool or compensate for tool wear, the machine operator need only run the spindle and tool up to the starting point on the workpiece, under manual control, release the plunger 115, reset the first trip disc dial 134 to the zero position, and clamp the trip disc assembly to the drive sleeve or drum 61 by tightening the set screw 121 to force the friction clamp 120 into engagement with the drum flange 67. No further setting or adjustment of the individual trip discs is necessary and the automatic operation can be immediately initiated.

When the trip discs have been set for a mode of operation as described above, the electrical circuit is conditioned for that mode by a selector switch 141 (FIG. 11a). In the illustrative circuit shown, a seven position selector switch is provided, accommodating the six modes shown in FIG. 9 and an off position. It will be appreciated, by those skilled in the art, that additional positions may be provided for selecting additional modes made possible by the ten trip discs 75–84 described above. The selector switch shown is constructed with four switch banks 141a, 141b, 141c and 141d coupled on a common shaft.

Means are provided for controlling the various elements necessary to carry out a drilling or tapping operation. One illustrative means for this purpose comprises a sequence stepper switch 142 which includes a deck for each mode, 142a, 142b, 142c, 142d, 142e, and 146f (e.g. for modes 1 through 6, respectively, as shown in FIG. 9) together with decks for energizing the various spindle shifters 35, 36, 37, which decks are identified as 142g (modes 1 and 5), 142h (modes 2 and 6), 142i (mode 3) and 142j (mode 4) and serve to energize relay coils STO, SFO, STI and SFI described above which in turn actuate the various spindle speed and feed clutches. In addition a deck 142k is provided for automatic tapping to energize the relay coil ATC for an automatic tapping clutch as well as spindle rotation direction control which include relay coils SCTR and SCTL for right-hand and left-hand spindle rotation respectively.

When the automatic cycling or more circuit is not to be used, the mode selector 141 is set at "O." In this position, one bank 141c connects a relay coil CR52 in the circuit which holds contacts CR52a closed to complete the limit switch controlled portion of the circuit and steppers 142a–142f so that the trip discs may be adjusted as described above, and which holds contacts CR52b open to deenergize the stepper solenoid SMS. Still another deck 142l is provided in series with the stepper solenoid SMS and various conditioning switches CR23, CR26, CR27, CR28 and CR29 which initially complete the circuit to the stepper solenoid and then open that position of the circuit so that the stepper solenoid is thereafter operated as a function of the spindle position as determined by the trip discs.

To illustrate the operation of the trip discs, assume that mode 1 has been selected as the desired cycle of operation, and that the trip discs 75, 76 and 77 have been set as described above. The mode selector switch 141 is set at mode 1, which simultaneously sets the switch banks 141a, 141b, 141c and 141d to the first position. The operator then selects the direction of spindle rotation and conditions the machine for operation by releasing the necessary clamps, selecting the spindle speeds and feeds, and carrying out all of the necessary conditioning operations. With the machine tool in condition for operation, the necessary conditioning switches CR23, CR26, CR27, CR28 and CR29 will be selectively closed, completing the circuit from the selector switch bank 141a to the spindle mode stepper solenoid SMS through stepper deck 142l. The automatic cycle start button 144 is then pressed closing contacts 144a to energize the stepper solenoid SMS thereby stepping each of the decks 142a–k one position, and opening mode deck 142l and the contacts SMS–a and SMS–b to break the stepper solenoid circuit. At the same time, the spindle start button closes switch 144b which energizes the automatic cycle start relay coil ACS and thereby closes contacts ACS–a, ACS–b, ACS–c and ACS–d. Each of the mode decks 142a–k having moved one position, relay coil STO (FIG. 11b) will then be energized through deck 142g, causing the spindle to travel outwardly at rapid traverse. As the spindle travels outwardly, the trip disc mechanism 40 rotates until the dog on the first disc 75 engages the corresponding mechanism 86 to open limit switch LS27 and thereby deenergize relay coil CR35 so that contacts CR35a and CR35b close. When this occurs, the spindle mode stepper solenoid SMS will then be energized (through mode deck 142a and selector switch 141b) to step the decks one step to the second position. When this occurs, the spindle feed out relay coil SFO will be energized (through deck 142g and selector switch 141c) and the spindle will feed during the drilling of the workpiece. At the end of the drilling and feed operation, the second trip disc 76 will engage its respective limit switch mechanism 87 to open limit switch LS28, and deenergize relay coil CR35 thereby closing contacts CR36a and CR36b. Again, the circuit will be completed to the spindle mode stepper solenoid SMS and the mode stepper switches will be indexed to the third position, at which time relay coil STI will be energized (through deck 142g and selector switch 141c) so that the spindle will traverse and withdraw the tool from the work.

At the innermost position of the spindle, the trip disc 77 will engage its corresponding limit switch mechanism 88 to open limit switch LS29 and deenergize relay coil CR37 to close contacts CR37a and CR37b and energize stepper coil SMS to step the decks to the fourth position. The spindle feed will be shut off and the spindle mode stepper coil SMS is continuously energized through mode deck 142a to step the decks completely around to the beginning position thereby readying the mechanism for a subsequent cycle.

Spindle modes 2 and 6, as illustrated, are for automatic tapping operations. These modes are carried out by utilizing mode stepper decks 142b, 142f, 142h and 142k in a manner similar to that described above in connection with mode 1. When the selector switch is set at mode 2 or 6, relay coil CR53 or CR54, respectively, is energized to close contacts CR53a or CR54a to condition the machine for tapping operations by completing the circuit through deck 142k to the automatic tap clutch coil ATC and the spindle direction coils SCTR and SCTC, and also by energizing an automatic tap coil (not shown) to open contacts ATR–a and close contacts ATR–b, and ATR–c. For automatic tapping, the trip discs are set in the same manner as described above in connection with mode 1. The mode selector switch 141 is set to mode 2, and after conditioning the machine for operation, the automatic cycle start button 144 is pressed. The trip discs will control the spindle mode stepper coil SMS through mode 2 deck 142b. At the end of the spindle feed out, coil SFO will be deenergized and coil SFI will be energized. At the same time the spindle rotation direction will be reversed through deck 142k and the spindle will feed in until the tap is withdrawn at which point the spindle will traverse in, the machine will be shut-off and reconditioned for the next operation.

We claim:

1. In a control mechanism for machine tools having a translatable element, the combination comprising a rotatable drum, means for rotating said drum in coordination with the translation of said machine tool element, a clamp sleeve freely journaled on said drum, means for releasably securing said sleeve to said drum for rotation bodily therewith, a plurality of independent trip discs freely journaled on said sleeve, means for releasably securing said discs individually to said sleeve for bodily rotation therewith and for individual adjustment with respect thereto, switch means engaged by said trip discs for controlling the operation of said machine tool element, and an indicator integral with one of said trip discs for indicating the position of said translatable element with respect to a reference point whereby said sleeve and said one trip disc can be set at the reference point and said remaining trip discs can be individually set at preselected distances therefrom for controlling the machine tool according to the translation of the translatable element.

2. In a control mechanism for machine tools having a translatable spindle, the combination comprising a support fixed relative to the translatable spindle, a rotatable drum journaled on said support, means for rotating said drum in coordination with the translation of said machine tool spindle, a sleeve mounted on said drum for relative rotation with respect thereto, a plurality of independent trip discs mounted on said sleeve for individual and independent adjustment with respect thereto, means for releasably engaging said sleeve for rotation with said drum and alternatively for clamping to said support means engaged by said trip discs for controlling the operation of said machine tool spindle, and an indicator dial integral with one of said trip discs for indicating the position of said translatable spindle with respect to a reference point whereby said sleeve and said one trip disc can be set at the reference point and said remaining trip discs can be individually set at preselected distances therefrom for controlling the machine tool according to the translation of the translatable spindle.

3. A control mechanism for machine tools having a translatable element and comprising, in combination, a rotatable drum, means mounting said drum for rotation in coordination with the translation of said machine tool element, means including a series of limit switches for controlling the operation of said machine tool according to the translation of the translatable element, a series of trip discs adjustably mounted on said drum and including means engageable with said limit switches, a locking sleeve mounted on said drum intermediate said drum and said trip discs, means for releasably locking said locking sleeve to said drum and means on said locking sleeve for individually engaging and locking each of said trip discs thereto, whereby said trip discs can be set to actuate said limit switches in any predetermined sequence as a function of the translation of said element.

4. A control device for controlling a machine tool having a translatable element and comprising, in combination, a housing, a shaft fixed in said housing, a drum rotatably mounted on said shaft and having a radial flange extending from one end thereof, a ring gear on said flange, a pinion gear meshed with said ring gear, a gear train including a worm gear coupling said pinion gear with said translatable element, a series of limit switches mounted on said housing, means for engaging and actuating said limit switches, a series of trip discs adjustably mounted on said drum and each having a dog engageable with a corresponding switch engaging means, a locking sleeve mounted on said drum, releasable means for locking said locking sleeve to said radial flange on said drum and means on said locking sleeve for individually engaging and locking each of said trip discs thereto whereby said trip discs can be set to actuate said limit switches in a predetermined sequence as a function of the translation of said element.

5. A control device for controlling a machine tool having a translatable element and comprising, in combination, a housing, a shaft fixed in said housing, a drum rotatably mounted on said shaft and having a radial flange extending from one end thereof, a ring gear on said flange, a pinion gear meshed with said ring gear, a gear train including a worm gear coupling said pinion gear with said translatable element, a series of limit switches mounted on said housing, means for engaging and actuating each of said limit switches including a lever pivoted at one end on said housing, a follower wheel intermediate the ends of said lever and an adjustable pin at the opposite end of said lever for engaging and actuating said limit switch, a series of trip discs adjustably mounted on said drum and each having a dog engageable with a corresponding follower wheel, a locking sleeve mounted on said drum discs, releasable means for locking said locking sleeve to said radial flange on said drum, and means on said locking sleeve for individually engaging and locking each of said trip discs thereto whereby said trip discs can be set to actuate said limit switches in a predetermined sequence as a function of the translation of said element.

6. A control device for controlling a machine tool having a translatable machine tool element and comprising, in combination, a housing, a drum rotatably mounted in said housing, means coupling said drum to the translatable element for rotation in coordination therewith, control means mounted on said housing including a series of limit switches and means for actuating the same, a series of trip discs adjustably mounted on said drum and engageable with said limit switch actuating means, a locking device mounted on said drum for individually engaging and locking each of said trip discs, means releasably locking said locking device to said drum, means on one of said trip discs for indicating the position of the translatable element with respect to a reference point, and means for indicating when at least one of said limit switches is actuated whereby said trip discs can be set to actuate said limit switches in a predetermined sequence as a function of the translation of said element to and from the reference point.

7. In a control mechanism for a machine tool having a translatable element, the combination comprising a rotatable drum, a sleeve mounted for rotation on said drum when said drum is rotated in coordination with the translation of said machine tool element, a plurality of independent trip discs serially spaced upon said sleeve, said mounting sleeve having a plurality of plungers radially disposed and axially spaced thereabout such that each plunger is positioned opposite a trip disc, means carried by said sleeve for manually urging any selected one of said plungers against its associated trip disc for securing the same against rotation relative to the mounting sleeve, means for engaging said mounting sleeve with said drum to prevent relative rotation therebetween, thereby providing a plurality of pre-positioned trip discs rotatable with said drum, and means engaged by said trip discs for controlling the operation of said machine tool element.

8. A control mechanism for machine tools having a translatable element and comprising, in combination, a rotatable drum, means mounting said drum for rotation in coordination with the translation of said machine tool element, means including a series of limit switches for controlling the operation of said machine tool according to the translation of the translatable element, a series of trip discs adjustably mounted on said drum and including means engageable with said limit switches, a locking sleeve mounted on said drum intermediate said drum and said trip discs, said sleeve having a plurality of radially disposed and serially spaced plungers each positioned for engagement with an associated trip disc, and means carried by said locking sleeve for urging each of said plungers against its associated trip disc for rigidly positioning the same relative to said sleeve, whereby said trip discs can be individually set relative to one another for actuating said limit switches in a predetermined sequence as said drum is rotated as a function of the translation of said element.

9. In a control mechanism for machine tools having a translatable element, the combination comprising a rotatable drum, means for rotating said drum in coordination with the translation of said machine tool element, a mounting sleeve disposed about the drum and being relatively rotatable with respect thereto, a spring loaded pin carried by said mounting sleeve for selectively engaging said drum to prevent relative rotation therebetween, a plurality of independent trip discs serially disposed about the mounting sleeve and being normally free to rotate relative thereto, a plurality of trip disc engaging means disposed radially about said mounting sleeve for permitting individual selective positioning and engagement of said trip discs, a trip dog disposed on the periphery of each said trip disc and fixed thereto so that the position thereof is determined by engagement of the particular trip disc with the mounting sleeve, a plurality of lever arms each disposed adjacent a trip disc and having one end thereof engageable with the trip dog fixed to the associated trip disc, a plurality of control switches mounted adjacent the end of the lever arm opposite that which is adapted to be engaged by said trip dogs, adjustable switch engaging means disposed in said lever arm so that when said trip dog engages said lever arm, said switches are actuated or deactuated by the movement thereof, so as to control position of the translatable element.

References Cited by the Examiner

UNITED STATES PATENTS

| | | | |
|---|---|---|---|
| 1,462,354 | 7/1923 | Pero | 77—3 |
| 2,419,222 | 4/1947 | Lambach | 90—176 |
| 2,583,376 | 1/1952 | Huebner | 90—176 |
| 2,600,213 | 6/1952 | Darash. | |
| 2,658,283 | 11/1953 | Ciccone | 90—176 |
| 2,978,940 | 4/1961 | Jeanneret. | |
| 3,154,984 | 3/1964 | Waymouth. | |

WILLIAM W. DYER, JR., *Primary Examiner.*